(12) United States Patent
Wheeler

(10) Patent No.: US 12,304,647 B2
(45) Date of Patent: *May 20, 2025

(54) THRUST ALLOCATION USING OPTIMIZATION IN A DISTRIBUTED FLIGHT CONTROL SYSTEM

(71) Applicant: Kitty Hawk Corporation, Palo Alto, CA (US)

(72) Inventor: Tim Allan Wheeler, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,566

(22) Filed: Jul. 31, 2023

(65) Prior Publication Data

US 2023/0406524 A1  Dec. 21, 2023

Related U.S. Application Data

(63) Continuation of application No. 17/473,668, filed on Sep. 13, 2021, now Pat. No. 11,912,426, which is a continuation of application No. 16/794,710, filed on Feb. 19, 2020, now Pat. No. 11,155,356.

(51) Int. Cl.
| | | |
|---|---|---|
| *B64D 31/12* | (2006.01) | |
| *B60L 15/20* | (2006.01) | |
| *B64C 29/00* | (2006.01) | |
| *B64D 27/24* | (2006.01) | |

(52) U.S. Cl.
CPC ............. *B64D 31/12* (2013.01); *B60L 15/20* (2013.01); *B64C 29/0025* (2013.01); *B64D 27/24* (2013.01); *B60L 2200/10* (2013.01)

(58) Field of Classification Search
CPC ......... B64D 31/12; B64D 27/24; B60L 15/20; B60L 2200/10; B64C 29/0025
USPC ............................................................ 701/3
See application file for complete search history.

(56) References Cited

U.S. PATENT DOCUMENTS

| | | | |
|---|---|---|---|
| 9,908,616 B1 | 3/2018 | Horn | |
| 9,977,432 B1 | 5/2018 | Cutler | |
| 2005/0119803 A1* | 6/2005 | Zentgraf | ................. B64G 1/26 701/13 |

(Continued)

FOREIGN PATENT DOCUMENTS

| | | |
|---|---|---|
| CN | 110062735 | 7/2019 |
| JP | 2002258905 | 9/2002 |

(Continued)

OTHER PUBLICATIONS

Gabe Hoffman, Control Mix, Oct. 24, 2014.
IP.com Search.

*Primary Examiner* — Mahmoud S Ismail
(74) *Attorney, Agent, or Firm* — Van Pelt, Yi & James LLP

(57) ABSTRACT

Thrust values for motors in an aircraft are generated where each flight controller in a plurality of flight controllers generates a thrust value for each motor in a plurality of motors using an optimization problem with a single solution. Each flight controller in the plurality of flight controllers passes one of the generated thrust values to a corresponding motor in the plurality of motors, where other generated thrust values for that flight controller terminate at that flight controller. The plurality of motors perform the passed thrust values.

14 Claims, 11 Drawing Sheets

(56) References Cited

U.S. PATENT DOCUMENTS

| | | | | |
|---|---|---|---|---|
| 2006/0043242 | A1* | 3/2006 | Benson | B64C 13/503 244/175 |
| 2010/0318454 | A1* | 12/2010 | Warncke | G06Q 40/04 705/37 |
| 2014/0097290 | A1* | 4/2014 | Leng | B60L 50/52 244/6 |
| 2016/0272300 | A1* | 9/2016 | Matsui | B64C 13/505 |
| 2017/0217600 | A1* | 8/2017 | Regev | B64D 35/02 |
| 2018/0239366 | A1 | 8/2018 | Cutler | |
| 2019/0202546 | A1 | 7/2019 | Mahboubi | |
| 2019/0291852 | A1* | 9/2019 | Atamanov | B64C 15/02 |
| 2019/0291863 | A1* | 9/2019 | Lyasoff | B64C 3/385 |
| 2020/0010187 | A1 | 1/2020 | Bevirt | |
| 2021/0107626 | A1* | 4/2021 | Yuksel | B64C 39/024 |

FOREIGN PATENT DOCUMENTS

| | | |
|---|---|---|
| JP | 2014227155 | 12/2014 |
| JP | 2020503209 | 1/2020 |
| WO | 2019224954 | 11/2019 |

\* cited by examiner

THRUST ALLOCATION USING OPTIMIZATION IN A DISTRIBUTED FLIGHT CONTROL SYSTEM

CROSS REFERENCE TO OTHER APPLICATIONS

This application is a continuation of U.S. patent application Ser. No. 17/473,668, entitled THRUST ALLOCATION USING OPTIMIZATION IN A DISTRIBUTED FLIGHT CONTROL SYSTEM filed Sep. 13, 2021, which is a continuation of U.S. patent application Ser. No. 16/794,710, now U.S. Pat. No. 11,155,356, entitled THRUST ALLOCATION USING OPTIMIZATION IN A DISTRIBUTED FLIGHT CONTROL SYSTEM filed Feb. 19, 2020, each of which is incorporated herein by reference for all purposes.

BACKGROUND OF THE INVENTION

Personal aircraft such as electric vertical take-off and landing (eVTOL) multicopters offer a way to bypass congested freeways and city streets. However, safety is an important consideration for such vehicles. In particular, some eVTOL multicopters do not have wings and so they cannot glide in the event of a motor out or other emergency. New techniques and/or systems which make aircraft such as eVTOL multicopters safer are desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a distributed flight control system that performs thrust allocation (i.e., generates thrust values for motors in a vehicle) using optimization problems with a single solution are described herein. In some examples described herein, the vehicle is an electric vertical take-off and landing (eVTOL) multicopter where each of the rotors (motors) is independently controllable and the thrust values are generated using the techniques described herein. As will be described in more detail below, the benefits of the system and/or techniques described herein may be especially apparent and/or useful if there is a motor out. For example, the system and/or techniques described herein may allocate thrust in a manner that permits a safer and/or more controlled emergency landing in the event of one or more motor outs. The following figure describes one such embodiment of a distributed flight control system that performs thrust allocation using convex optimization.

Figure 1:
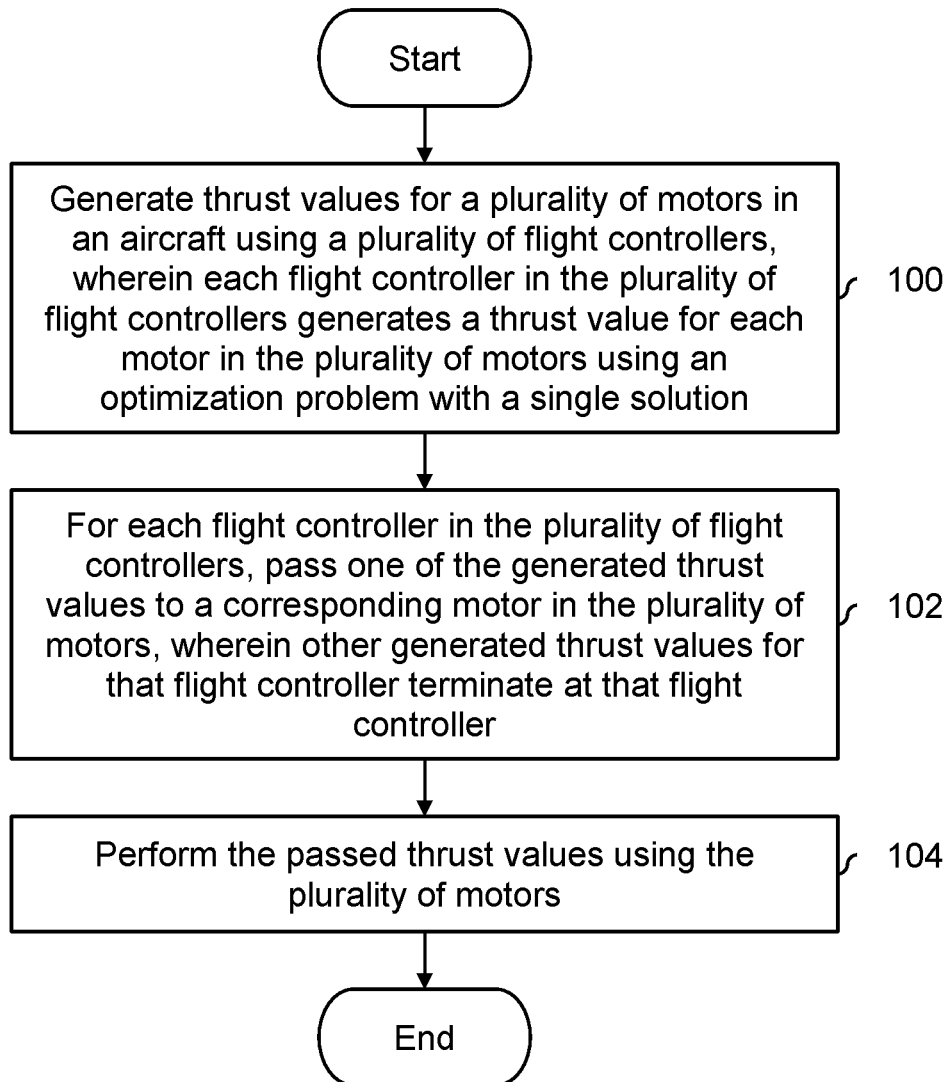
FIG. 1 is a flowchart illustrating an embodiment of a process to generate thrust values using an optimization problem with a single solution and have motors perform those thrust values.

FIG. 1 is a flowchart illustrating an embodiment of a process to generate thrust values using an optimization problem with a single solution and have motors perform those thrust values. As described above, in some embodiments, the process is performed by and/or in an eVTOL aircraft.

At 100, thrust values are generated for a plurality of motors in an aircraft using a plurality of flight controllers, wherein each flight controller in the plurality of flight controllers generates a thrust value for each motor in the plurality of motors using an optimization problem with a single solution. For example, suppose there are N motors and N flight controllers in the aircraft. Each of the flight controllers uses a strictly convex or strictly concave optimization problem (e.g., finding the minimum of a strictly convex optimization function, described in more detail below) to generate the thrust values. Because the optimization problem (e.g., performed by the flight controllers) is strictly convex or strictly concave, there is a single unique solution. This permits all flight computers to perform thrust allocation in parallel but still come to the same solution, thus permitting a distributed flight control system architecture. In various embodiments, the flight controllers may be implemented in hardware (e.g., an application-specific integrated circuit (ASIC), field-programmable gate array (FPGA)) or software (e.g., firmware running on an embedded microprocessor).

At 102, for each flight controller in the plurality of flight controllers, one of the generated thrust values is passed to a corresponding motor in the plurality of motors, wherein other generated thrust values for that flight controller terminate at that flight controller. For example, suppose a first flight controller generates 10 thrust values for motors that are indexed or numbered 1-10, respectively. The first generated thrust value (associated with and/or intended for a first motor) is passed to that first motor. The other generated thrust values from the first flight controller are not connected to any motor and terminate at the first flight controller. At the second flight controller, the second generated thrust value is passed to the second motor, but the other generated thrust values are not connected to any motor and so on.

At 104, the passed thrust values are performed using a plurality of motors. To put it another way, the motors execute the thrust values that they receive (e.g., the first motor performs the first thrust value from the first flight controller, the second motor performs the second thrust value from the second flight controller, etc.). As will be described in more detail below, in the event of a motor out, this process may be better able to perform an emergency landing (e.g., the emergency landing is safer and/or is a more controlled descent).

To better understand the process of FIG. 1, it may be helpful to describe an exemplary vehicle that performs the process described above. The following figure describes an exemplary eVTOL aircraft that uses the process of FIG. 1 to control its motors.

Figure 2:
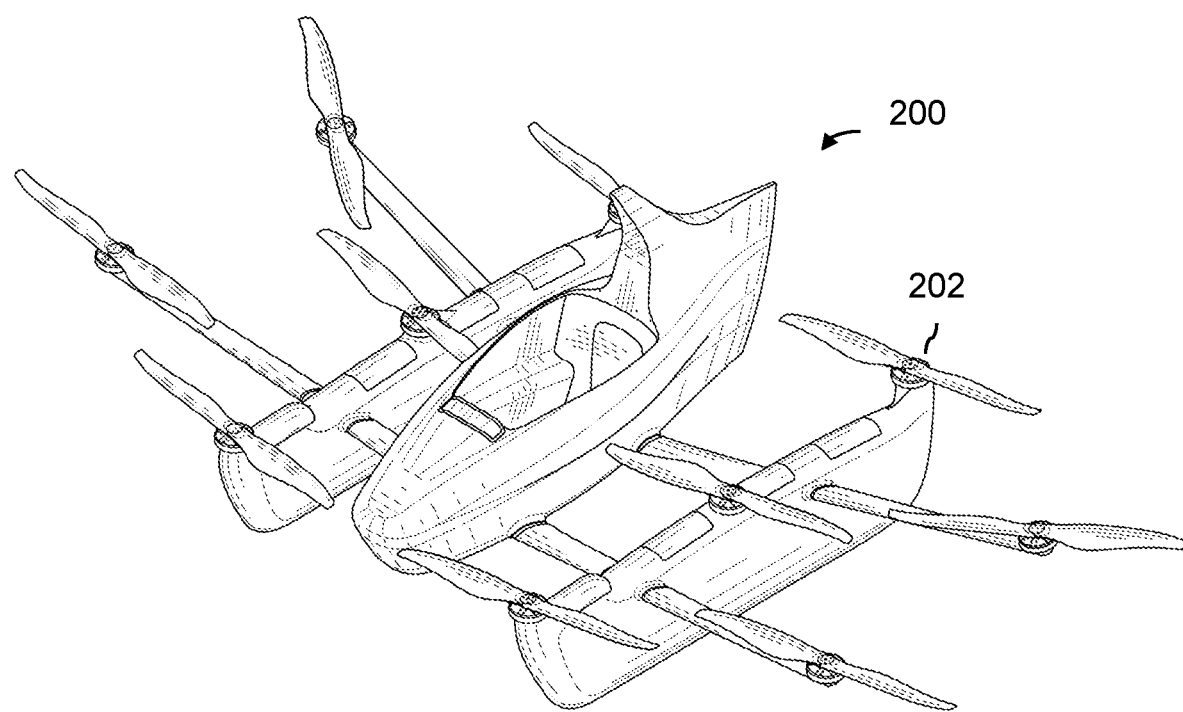
FIG. 2 is a diagram illustrating an embodiment of an electric vertical take-off and landing (eVTOL) multicopter.

FIG. 2 is a diagram illustrating an embodiment of an electric vertical take-off and landing (eVTOL) multicopter. In this example, the eVTOL aircraft (200) is a multicopter with 10 rotors (e.g., rotor 202). Each of the 10 rotors is powered and/or controlled independently by its own motor and its own battery, not shown here. This independent controllability permits the eVTOL aircraft to perform various maneuvers. The rotors are at a fixed position and angle. As such, to maneuver or otherwise fly the aircraft, the motors are independently controlled to produce the desired forces and moments. Some example maneuvers are described below.

Figure 3A:
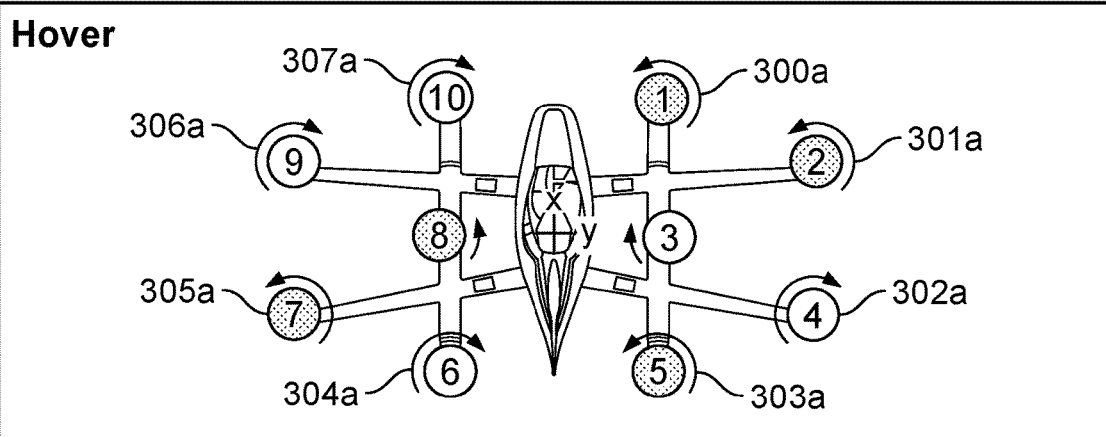
FIG. 3A is a top-view diagram illustrating an embodiment of an eVTOL multicopter that is hovering with associated rotor spin directions and rates shown.

FIG. 3A is a top-view diagram illustrating an embodiment of an eVTOL multicopter that is hovering with associated rotor spin directions and rates shown. In this example where the vehicle (shown in FIG. 2) is hovering, the outer eight rotors (300a-307a) are spinning approximately equally to provide no overall moment. Note, for example, that the magnitudes of the curved arrows associated with rotors 300a-307a are approximately the same length. The direction of the arrow indicates the direction of spin for a given rotor. The spin rate (e.g., represented by the length of a curved arrow) of a given motor (rotor) is controlled by the thrust value generated for that motor (e.g., generated at step 100 in FIG. 1).

Figure 3B:
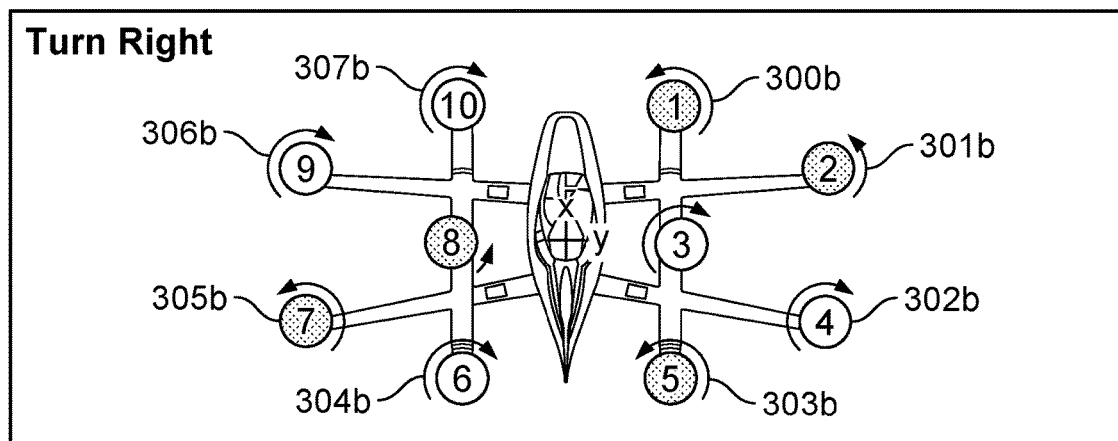
FIG. 3B is a top-view diagram illustrating an embodiment of an eVTOL multicopter that is turning right with associated rotor spin directions and rates shown.

FIG. 3B is a top-view diagram illustrating an embodiment of an eVTOL multicopter that is turning right with associated rotor spin directions and rates shown. In this example, the vehicle is turning right and therefore the rotors that spin in a clockwise direction (e.g., rotors 302b, 304b, 306b, and 307b) are rotated at a faster rate than the counterclockwise rotors (e.g., rotors 300b, 301b, 303b, and 305b). This maintains the overall vertical force (e.g., thus maintaining a steady altitude) while increasing the overall yaw moment (e.g., so that the vehicle turns).

Figure 3C:
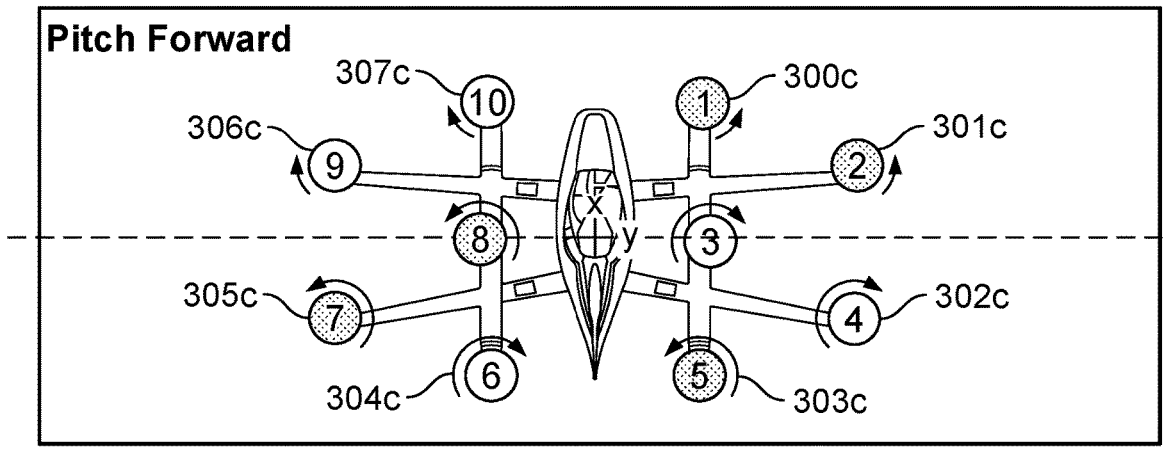
FIG. 3C is a top-view diagram illustrating an embodiment of an eVTOL multicopter that is pitching forward with associated rotor spin directions and rates shown.

FIG. 3C is a top-view diagram illustrating an embodiment of an eVTOL multicopter that is pitching forward with associated rotor spin directions and rates shown. To provide the necessary pitching moment, the rear rotors (e.g., rotors 302c-305c) which are behind the center of mass spin faster than the front rotors (e.g., rotors 300c, 301c, 306c, and 307c).

The control thrust values used to control the motors may be generated by a variety of (control) systems. The following figure describes an example of an older system with redundant flight controllers and a decision block.

Figure 4:
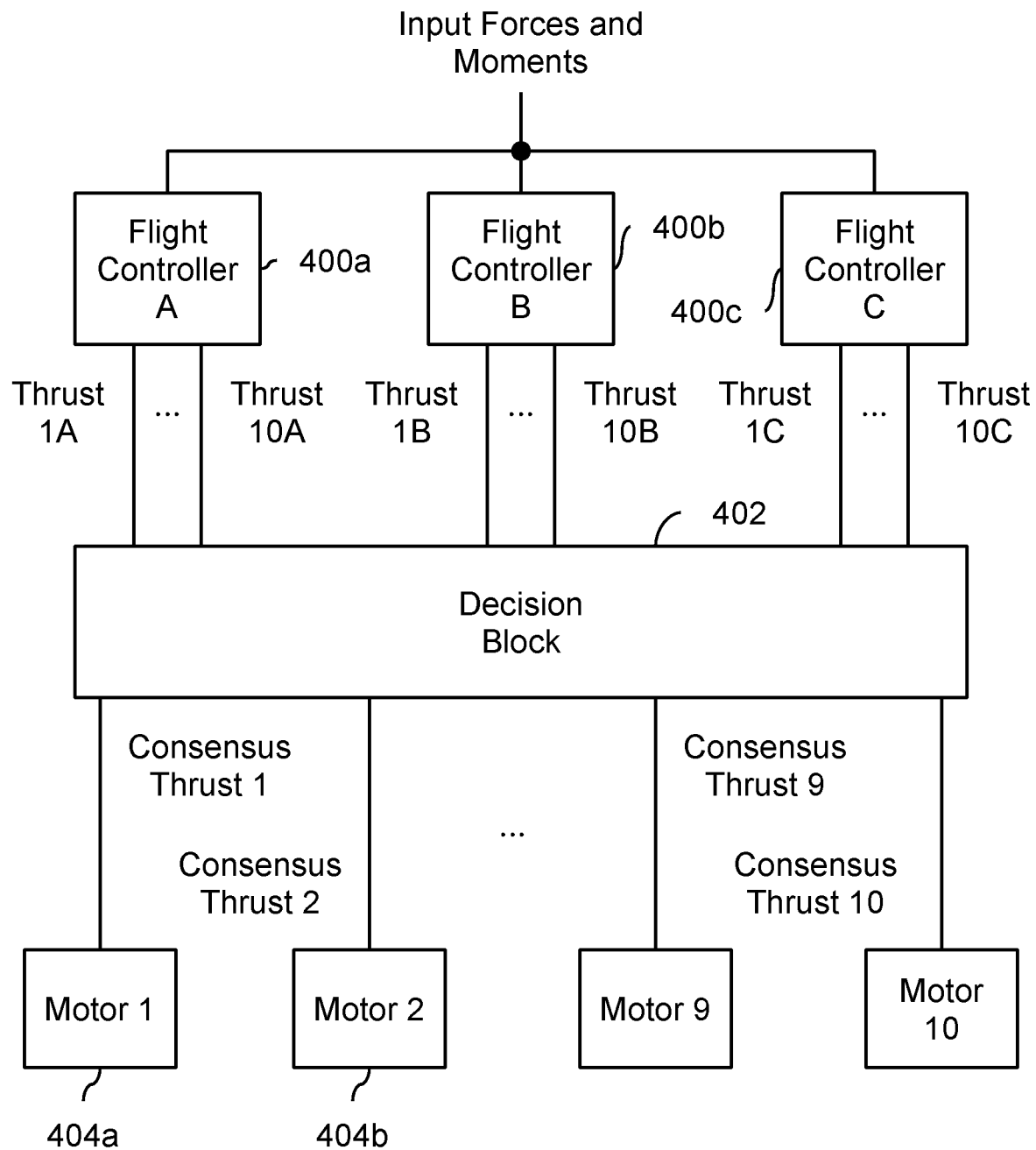
FIG. 4 is a diagram illustrating an example of a flight control system with redundant flight controllers and a decision block.

FIG. 4 is a diagram illustrating an example of a flight control system with redundant flight controllers and a decision block. In this example of how other systems perform thrust allocation, three flight computers (400a-400c) are used to provide redundancy. The flight computers input the (desired) forces and moments (e.g., $F_z$, $M_x$, $M_y$, and $M_z$). Each flight computer performs thrust allocation (i.e., generates thrust values) to produce the input and/or desired forces and moments. For example, flight controller A (400a) generates thrust values 1A-10A for motors 1 through 10, respectively. Similarly, flight controller B (400b) generates thrust values 1B-10B for motors 1 through 10, respectively, and so on.

All of the generated thrust values are passed from the flight computers (400a-400c) to a decision block (402). The decision block comes to a decision about what thrust values to pass on to the motors using all of the generated thrust values. For example, a voting scheme may be used where the decision block may compare the thrust values for a given motor from each of the flight computers (e.g., for motor 1, thrust values 1A-1C would be compared). If two or more of the thrust values are the same for a given motor, then that thrust value is output as a first consensus thrust value (e.g., consensus thrust 1) and is passed to that motor (e.g., motor 1 (404a)). For example, in the event thrust 1A from flight controller A (400a) and thrust 1B from flight controller B (400b) are the same for the first motor (404a) but thrust 1C from flight controller C (400c) is different, then decision block 402 (at least in this voting scheme example) passes on the majority-voted thrust value of thrust 1A/1B.

Similarly, a second consensus thrust value (e.g., consensus thrust 2) is generated by the decision block (402) for the second motor (404b) based on the input thrust values for that motor (e.g., thrust 2A, 2B, and 2C from flight controller A (400a), flight controller B (400b), and flight controller C (400c), respectively). This is done for each motor in the system.

One drawback associated with the control system shown here is that the decision block (402) may be complex. For example, for redundancy, the decision block may also have to be duplicated, which requires more communication channels and/or another layer of voting to the decision making. To put it more generally, decision blocks tend to be complex. The following figure shows an improved and/or simpler (control) system which later was found to be faster and/or better at achieving the desired forces and moments.

Figure 5:
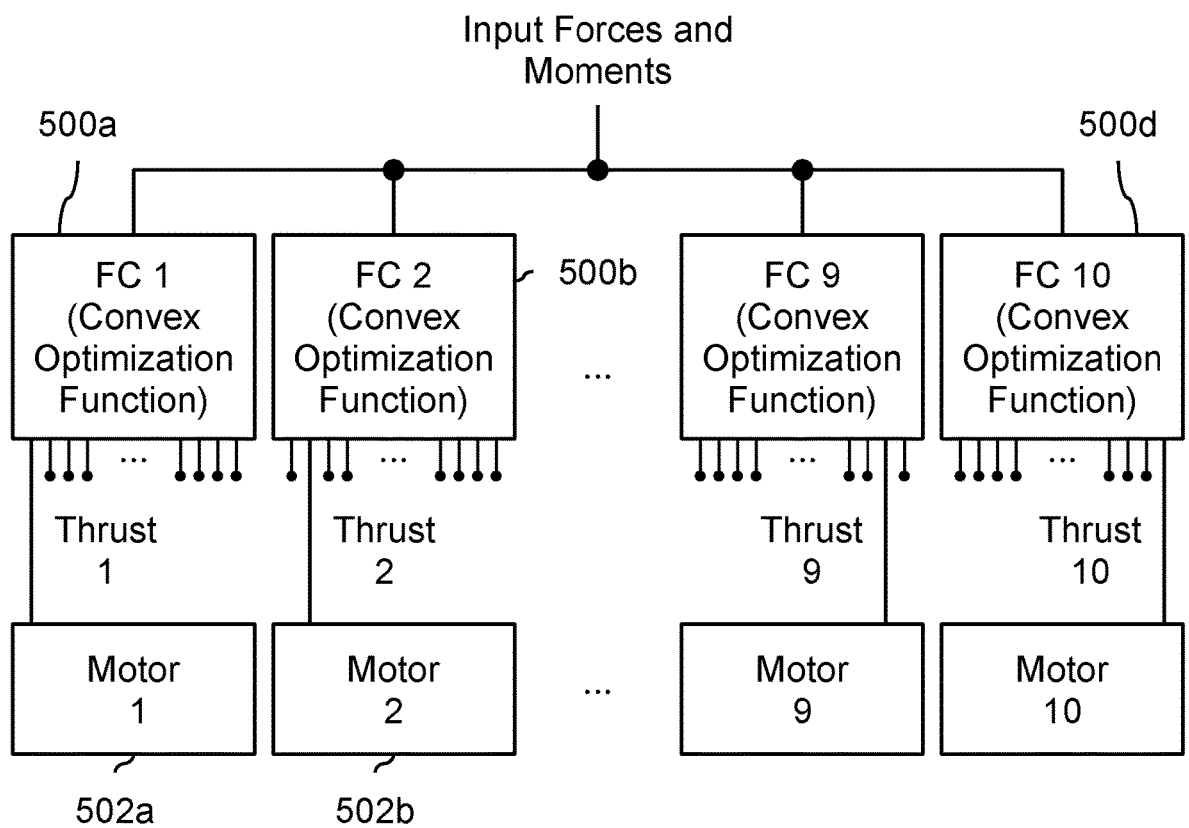
FIG. 5 is a diagram illustrating an embodiment of a distributed flight control system. In this example, the number of flight controllers equals the number of motors.

FIG. 5 is a diagram illustrating an embodiment of a distributed flight control system. In this example, the number of flight controllers equals the number of motors. As such, in this example there are 10 flight controllers (500a-500d) since there are 10 motors. In contrast, the number of flight controllers in the example of FIG. 4 is selected according to other design objectives: an odd number (e.g., because a voting system is used in that example) that is greater than or equal to 2 (e.g., for redundancy) so 3 flight controllers are used.

Each of the 10 flight controllers in this example inputs the same desired forces and moments and generates thrust values for each of the motors. Instead of using a decision block, only selected generated thrust values are connected to and/or used to control a motor. For example, the first thrust value (associated with and/or intended for the first motor (502a)) from the first flight controller (500a) is passed to the first motor (502a). The other generated thrust values from the first flight controller (500a) are unconnected and/or unused. The other generated thrust values for the first motor (502a) generated by the second flight controller (500b) through the tenth flight controller (500d) are not connected to and/or used to control the first motor (502a). Briefly returning to FIG. 1, this is an example of how some of the generated thrust values terminate at a flight controller (e.g., the second—tenth thrust values coming out of flight controller 1 (500a) are not connected to any motor). To put it another way, each flight computer believes that it is flying the entire vehicle and therefore solves the full thrust allocation problem (i.e., generates a thrust value for all motors in the vehicle, in this example, 10). However, the thrust value for only a single motor (e.g., the motor corresponding to that flight controller) is actually sent to a motor.

Similarly, the second thrust value (associated with and/or intended for the second motor (502b)) from the second flight controller (500b) is passed and/or connected to the second motor (502b). The other nine generated thrust values from the second flight controller (500b) are not connected (e.g., the first and third—tenth thrust values). This pattern repeats for the remaining flight controllers and remaining motors.

A requirement or constraint on the system shown here is that it is contingent upon all of the flight controllers arriving at the same solution and/or thrust values. In practice, the thrust values do not need to be exact. The system will work as long as the generated thrust values are all within a small tolerance (e.g., a motor thrust resolution, within 1N of force, etc.) of one another (e.g., due to slightly different state estimates due to sensor and/or process noise). Another way to put this is that the flight computers perform the same thrust allocation process so that they can produce (near) identical thrust values. This property allows the flight computers to run independently.

Generally speaking, it was found that the thrust allocations (i.e., the generation of thrust values given the input and/or desired forces and moments) performed by the distributed control system shown here produced better results compared to the control system shown in FIG. 4. For example, it uses fewer and/or simpler (electronic) components (e.g., there is no decision block which tends to be complicated).

It is noted that the techniques and/or systems described herein are applicable to autonomous flight as well as manned flight. In other words, the input forces and moments may be coming from a pilot via hand controls, or from an autonomous flight controller. As has been described herein, the benefits of this system are especially apparent during a motor out condition. In some manned applications, the vehicle switches over from a manned flight mode (e.g., where the pilot controls the aircraft) to an autonomous flight mode if a motor out is detected. The autonomous flight controller may then pass, to the flight controllers, input forces and moments associated with an emergency flight plan to land the vehicle as soon as is safely possible.

As described above, the techniques and/or systems described herein are especially beneficial and/or useful in the event of one or more motor outs. The following figure shows an example motor out condition so that some benefits and/or improvements associated with the techniques and/or systems described herein can be described.

Figure 6:
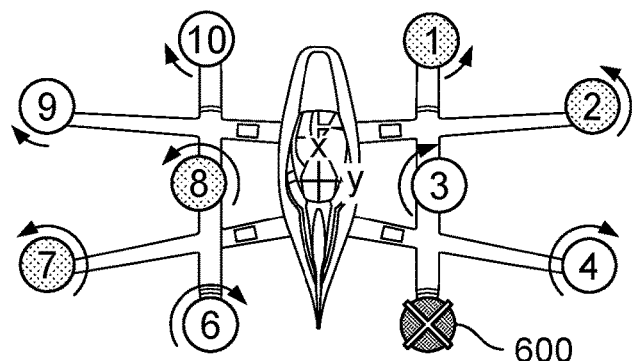
FIG. 6 is a top-view diagram illustrating an embodiment of an eVTOL multicopter with a motor out.

FIG. 6 is a top-view diagram illustrating an embodiment of an eVTOL multicopter with a motor out. In this example, the exemplary eVTOL multicopter does not have wings to perform wing-borne flight (see, e.g., the perspective view shown in FIG. 2) and as such must rely entirely on the rotors to remain airborne. The eVTOL multicopter shown herein is also an ultralight vehicle with stringent weight restrictions, which may prevent the addition of such wings. For these reasons, improved (control) systems that are better able to land the eVTOL aircraft (e.g., in a more controlled manner, with less impact, etc.) in the event of a motor out condition without requiring additional and/or heavier parts are more desirable for this ultralight application and/or example vehicle. Naturally, the techniques described herein have applications in other vehicles and may be implemented in other vehicles.

In this example, the vehicle is pitching forward when one of the motors (600) goes out. For example, the system goes from the state shown in FIG. 3C to the state shown here. Even with the distributed control system shown in FIG. 5, the thrust allocation may be less than optimal with some thrust allocation techniques. The following figure shows an example of how thrust allocation was previously performed where the multicopter could crash if some motors went out.

Figure 7:
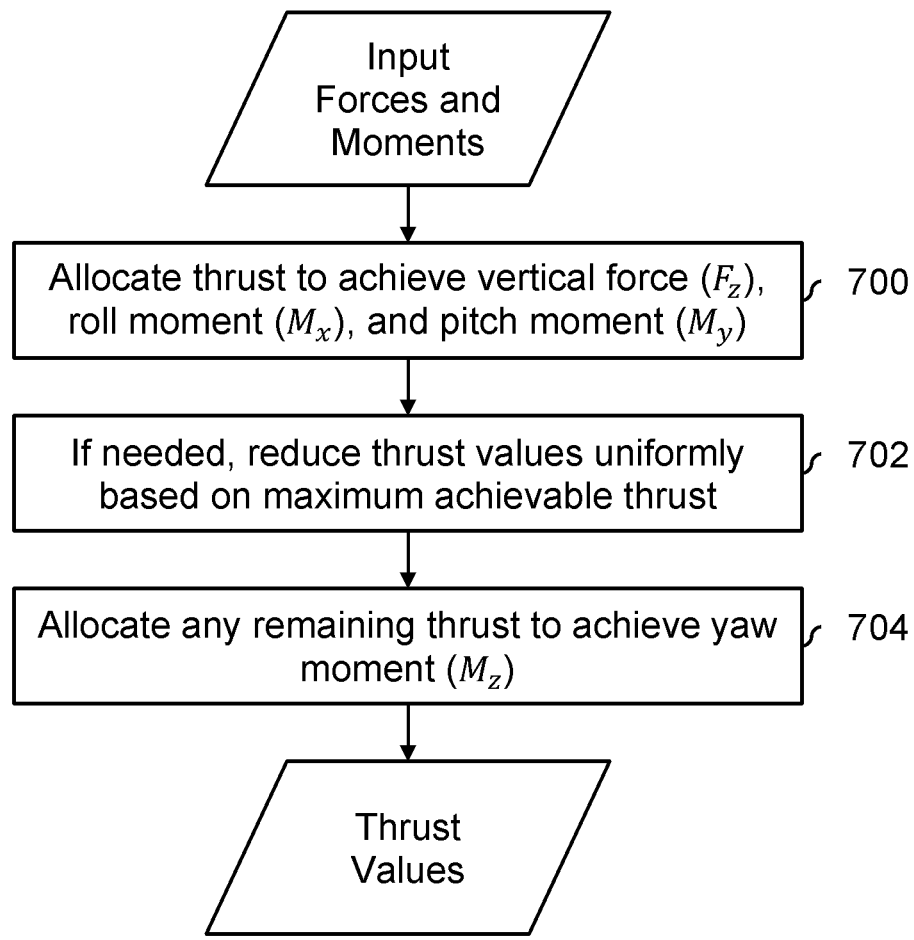
FIG. 7 is a diagram illustrating an example of a staged thrust allocation process. In this example of thrust allocation, thrust is allocated in stages.

FIG. 7 is a diagram illustrating an example of a staged thrust allocation process. In this example of thrust allocation, thrust is allocated in stages. The input and/or desired forces and moments ($F_z$, $M_x$, $M_y$, and $M_z$) are used as inputs to the process. For example, in FIG. 6, forces and moments associated with pitching forward would be input to the thrust allocation process.

At 700, thrust is allocated to achieve vertical force ($F_z$), roll moment ($M_x$), and pitch moment ($M_y$). For example, in FIG. 6, there are 10 motors for which thrust values are generated and the 10 thrust values are assigned values greater than or equal to zero in order to achieve the input vertical force ($F_{zdes}$), roll moment ($M_{xdes}$), and pitch moment ($M_{ydes}$). It is noted that at this step, yaw control (e.g., represented by the desired yaw moment, $M_{zdes}$) is not taken into account.

At 702, if needed, the thrust values are uniformly reduced based on a maximum achievable thrust. At step 700, another factor that is not taken into consideration during the (initial) thrust allocation is the maximum thrust achievable by the motors. Saturation is when one or more of the motors is at a maximum achievable thrust. If this occurs, in this example, the thrust values generated at step 700 are uniformly reduced so that they do not exceed the maximum achievable thrust. This is sometimes referred to as clipping.

At 704, any remaining thrust is allocated to achieve a yaw moment ($M_z$). For example, the thrust values that are output at step 702 may not necessarily produce the input and/or desired yaw moment ($M_{zdes}$) and if there is any remaining thrust (e.g., within the maximum thrust achievable limit) it is allocated to one or more of the motors to achieve (or at least be closer to) the input and/or desired yaw moment ($M_{zdes}$).

The staged process of FIG. 7 is fast and efficient, but has some drawbacks. The most severe issue is that the loss of certain motors (e.g., even one) can cause the exemplary eVTOL multicopter to crash. In the event of a motor out (see, e.g., FIG. 6), the thrust allocation process described in FIG. 7 would simply scale up the input and/or requested vertical force ($F_{zdes}$). In the example of FIG. 6, the (original) requested $F_{zdes}$ is scaled up by a factor of 10/9, as there are 10 motors total with 9 of them operational. The new desired vertical force input to the process of FIG. 7 would then be $$\frac{10}{9} F_{zdes}.$$

This approach is suboptimal, as the solver continues to allocate thrusts (e.g., at step 700) as if all 10 motors are available. Any contribution to the vertical force ($F_z$), roll moment ($M_x$), and pitch moment ($M_y$) (e.g., at step 700) by the non-functioning motor will be missing or lacking due to the non-functioning motor being used to allocate thrust and the resulting thrust values may not achieve the desired control. In some cases (e.g., if certain motors go out), this results in the eVTOL multicopter crashing.

Even if the vehicle does not crash, the flight experience may be uncomfortable and/or suboptimal, particularly if saturation occurs. To correct for saturation in this example requires clipping (e.g., at step 702 in FIG. 7) which is a crude corrective technique. As a result of clipping, the altitude may be mismatched (i.e., the clipped thrust values may produce a vertical force that does not match the desired vertical force and so the vehicle may undesirably rise or fall). Clipping at step 702 may also cause the roll moment and/or pitch moment to similarly be mismatched. The clipped thrust values may produce a roll moment and/or pitch moment that does not match the desired roll moment and/or pitch moment and so the vehicle may undesirably roll and/or pitch. This often leads to oscillations which increase risk to the passenger and increase the difficulty of piloting. To put it another way, the generated thrust values may not produce the desired forces and moments and/or the flight experience may be uncomfortable and/or dangerous for occupants.

In contrast, using an optimization problem with a single solution (e.g., a strictly convex optimization problem) to allocate thrust (e.g., at step 100 of FIG. 1) provides a safer flight experience, even if one or more of the motors go out. The following equation is an example convex optimization problem that is used to allocate thrust (e.g., at step 100 in FIG. 1).

Equation 1

Example strictly convex optimization problem used in thrust allocation.

$$\underset{T}{\text{minimize}} \quad \left\| \sqrt{W}(AT - F_{des}) \right\|_2 + \epsilon \left\| V_n^T T \right\|_2$$

$$\text{subject to} \quad 0 \leq T \leq T_{max}$$

In this example, Equation 1 is a convex optimization problem (in this case, strictly convex and a quadratic function) where T is the vector of motor thrusts, $F_{des}$ is the vector of desired forces and moments, A is the loads cosine matrix that maps motor thrusts into achieved forces and moments, W is a diagonal weighting matrix, $V_n$ is the submatrix of the unitary matrix from the singular value decomposition of A that projects T into the null space of the forces and moments, and $\epsilon$ is a small positive value (e.g., to reduce the magnitude of the second term (i.e., ensuring the function is strictly convex) relative to the first term (i.e., achieving the desired forces and moments)). It is noted that although this example optimization problem finds the minimum of a (strictly) convex function, in some embodiments, the optimization problem finds the maximum of a (strictly) concave function.

In the context of inputs and output, T (the vector of motor thrusts) is the output that the convex optimization problem solves for and outputs, and $F_{des}$ (the vector of desired forces and moments) and the motor outs (if any) are the inputs. Any motor outs are reflected in the array $T_{max}$, the maximum thrust vector. For example, if the $i^{th}$ motor is out then the $i^{th}$ component in $T_{max}$ is zeroed out which in turn forces the $i^{th}$ component in T to be zero as well, corresponding to no thrust at the $i^{th}$ motor.

One of the most important properties of the example convex optimization problem shown in Equation 1 is that the example eVTOL multicopter is no longer vulnerable to certain motors going out. With the example convex optimization problem running on the distributed flight control system (see, e.g., FIG. 5), the eVTOL multicopter can remain airborne if any of the motors goes out. In some cases, depending on the pair of motors, the eVTOL multicopter can even remain airborne if two motors go out. It is noted that other optimization problems similarly improve the airworthiness of a vehicle in the event of one or more motor outs.

It is noted that the example optimization problems described herein (e.g., Equation 1, Equation 2, etc.) are all agnostic with respect to the number of motors and/or to their placement or configuration on the aircraft. For example, if during development of a next generation eVTOL multicopter it was decided to change the number, size, and/or placement or arrangement of the motors from their current configuration, the same optimization problems and/or thrust allocation process could be reused. This is helpful because the flight control system will be known, predictable, and has been thoroughly tested in contrast with a new system that would have to be developed if the system were not scalable and/or adaptable.

For convenience and ease of explanation, Equation 1 has a number of properties and/or characteristics associated with it (e.g., strictly convex, quadratic, etc.). This convex optimization problem is merely exemplary and other convex optimization problems may have some other combination or properties and/or characteristics (e.g., strictly convex but not quadratic). It may be helpful to go through a brief derivation to illustrate the benefits associated with various inputs, parameters, and such included in Equation 1. The following equation shows an example of a simpler convex optimization problem.

Equation 2

An example least-squares convex optimization problem.

$$\min_{T} \|AT - F_{des}\|_2$$

subject to $0 \leq T \leq T_{max}$

In the example of Equation 2, a least-squares objective is used to minimize the difference between the desired forces and moments (i.e., $F_{des}$) and the realized forces and moments (i.e., AT), subject to the constraint that motor thrusts are non-negative (i.e., the constraint $0 \leq T$) and at most $T_{max}$ (i.e., the constraint $T \leq T_{max}$).

The constraint that $0 \leq T \leq T_{max}$ and the zeroing out of the corresponding element in $T_{max}$ should any of the motors go out means that the thrust values generated using the exemplary convex optimization problems described herein (e.g., Equation 1, Equation 2, etc.) are always feasible. That is, the flight controllers will always produce a set of motor thrusts that are feasible (e.g., non-negative and never exceeding $T_{max}$), even in the event of a motor out. Moreover, the example optimization problems described herein are always feasible no matter what, so there are no corner cases to handle separately (described in more detail below). Conceptually, this avoids the problem of saturation in the first place whereas the staged process of FIG. 6 permits an infeasible set of motor thrust values to be generated (i.e., saturation) and then needs to fix the problem after the fact (e.g., by clipping, which is a poor and/or crude solution).

Another benefit to incorporating any motor outs into the maximum thrust vector ($T_{max}$) is that this enables motor out information to be incorporated in a better and/or cleaner manner. For example, some other techniques may try to incorporate the motor out information in design variables or may otherwise reformulate the problem (e.g., switching to a different optimization problem if a motor out occurs), both of which may make thrust allocation more complicated and/or slower to produce an acceptable set of thrust values. The $T_{max}$ vector needs to be there to reflect the thrust limitations of the motors and so an existing element in the optimization function serves multiple purposes.

The following figure describes this example more formally.

Figure 8:
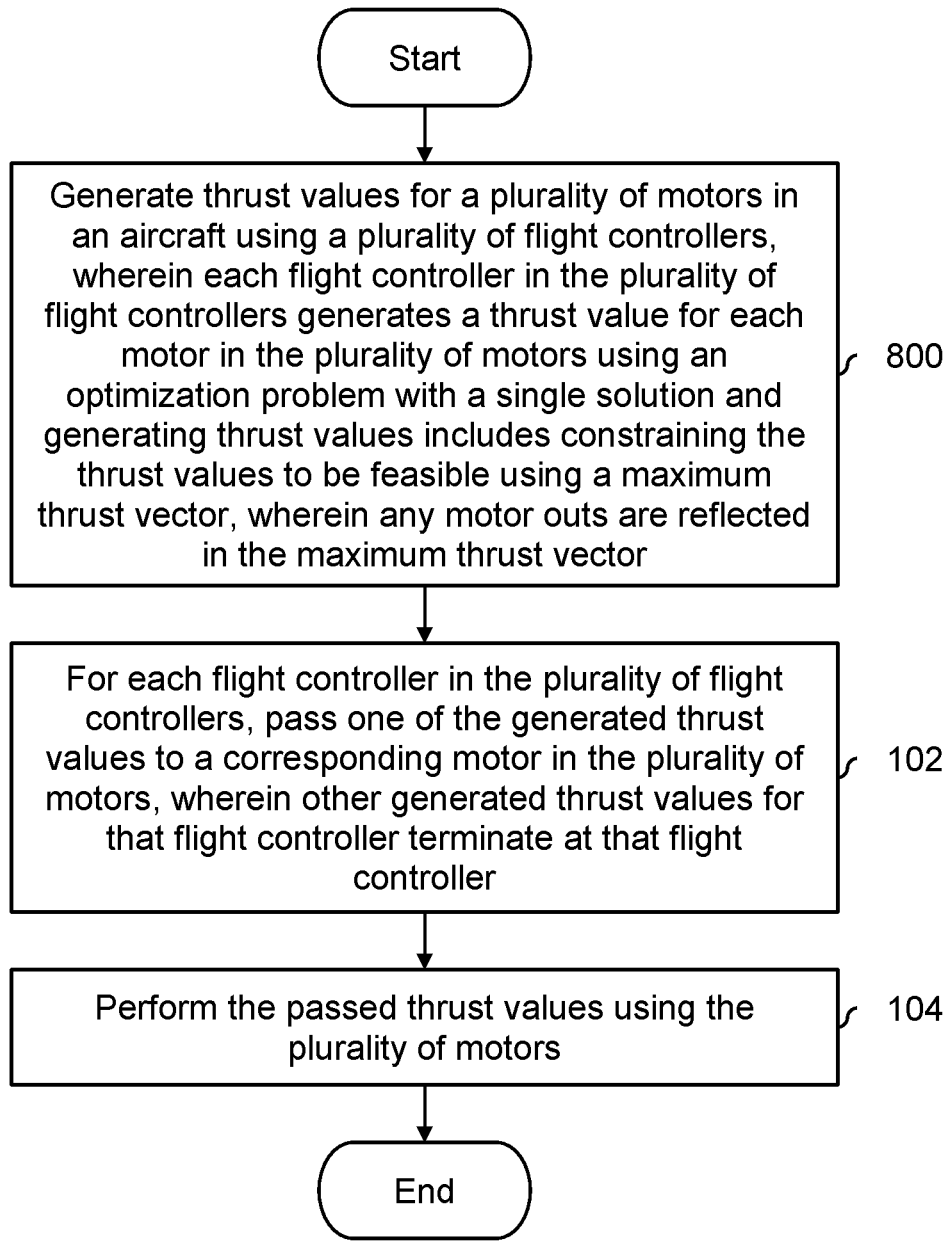
FIG. 8 is a flowchart illustrating an embodiment of a process to generate thrust values, including by using a maximum thrust vector.

FIG. 8 is a flowchart illustrating an embodiment of a process to generate thrust values, including by using a maximum thrust vector. FIG. 8 is related to FIG. 1 and for convenience the same or similar reference numbers are used to show the same or related steps.

At 800, thrust values are generated for a plurality of motors in an aircraft using a plurality of flight controllers, wherein each flight controller in the plurality of flight controllers generates a thrust value for each motor in the plurality of motors using an optimization problem with a single solution and generating thrust values includes constraining the thrust values to be feasible using a maximum thrust vector (e.g., $T \leq T_{max}$), wherein any motor outs are reflected in the maximum thrust vector. In some embodiments of step 800, constraining the thrust values to be feasible further includes constraining the thrust values to be greater than or equal to zero (e.g., $0 \leq T$ in addition to $T \leq T_{max}$).

As described above, constraining the thrust values to be feasible forces the optimizer to reason about saturation directly, producing a better and faster result. Also, using the maximum thrust vector to reflect motor outs permits a simpler design (e.g., no additional parameters, inputs, etc. are required). In some embodiments, if a motor out is detected or otherwise flagged, a corresponding value in $T_{max}$ (e.g., the one corresponding to the detected motor out) is zeroed out immediately. For example, the motor out may be for a variety of reasons. In some cases, there is a communications loss with a motor, which means that it is not known how long ago the motor went out. Also, even if a non-zero value (e.g., corresponding to the detected motor out) were gradually decayed or otherwise zeroed out, the motor spin frequency is relatively fast so the decaying would similarly occur relatively quickly and any benefit is thus small.

At 102, for each flight controller in the plurality of flight controllers, one of the generated thrust values is passed to a corresponding motor in the plurality of motors, wherein other generated thrust values for that flight controller terminate at that flight controller.

At 104, the passed thrust values are performed using a plurality of motors.

Returning briefly to Equation 2, in some embodiments, active set techniques, methods, or processes are used to solve a convex optimization problem (e.g., Equation 1, Equation 2, etc.). Active set techniques begin with a feasible point (e.g., an initial vector of motor thrusts T that is required to be $0 \leq T \leq T_{max}$ and is therefore feasible) and a set of constraints (e.g., if any of the thrust values are at saturation values defined by $T_{max}$, such as a given thrust value being at a non-zero saturation value in $T_{max}$ when a given motor is operational, a zeroed-out saturation value in $T_{max}$ when a given motor is out, or when the thrust value is at zero and the corresponding element in $T_{max}$ is non-zero). Another way to put it is if the thrust value is being constrained by the upper limit or the lower limit. The thrust values are iteratively updated in a finite number of steps to obtain an optimal solution by keeping track of which constraints are active (i.e., actively constraining a given thrust value) in order to more efficiently solve problems. If is known, for example, that motor 3 was saturated in the previous step (e.g., the motor thrust value for motor 3 is maxed out at the $3^{rd}$ value in the vector $T_{max}$), then it will probably be saturated in the next iteration as well. The next iteration solves the problem without changing that thrust (e.g., the constrained one) but then verifies that the resulting solution indeed continues to be optimal with an exemplary saturated third motor. This reduces the number of thrust values that need to be considered, evaluated, and/or adjusted in the next iteration, reducing the number of things the process considers and leading to much faster average solve times.

The following figure describes this example more formally.

Figure 9:
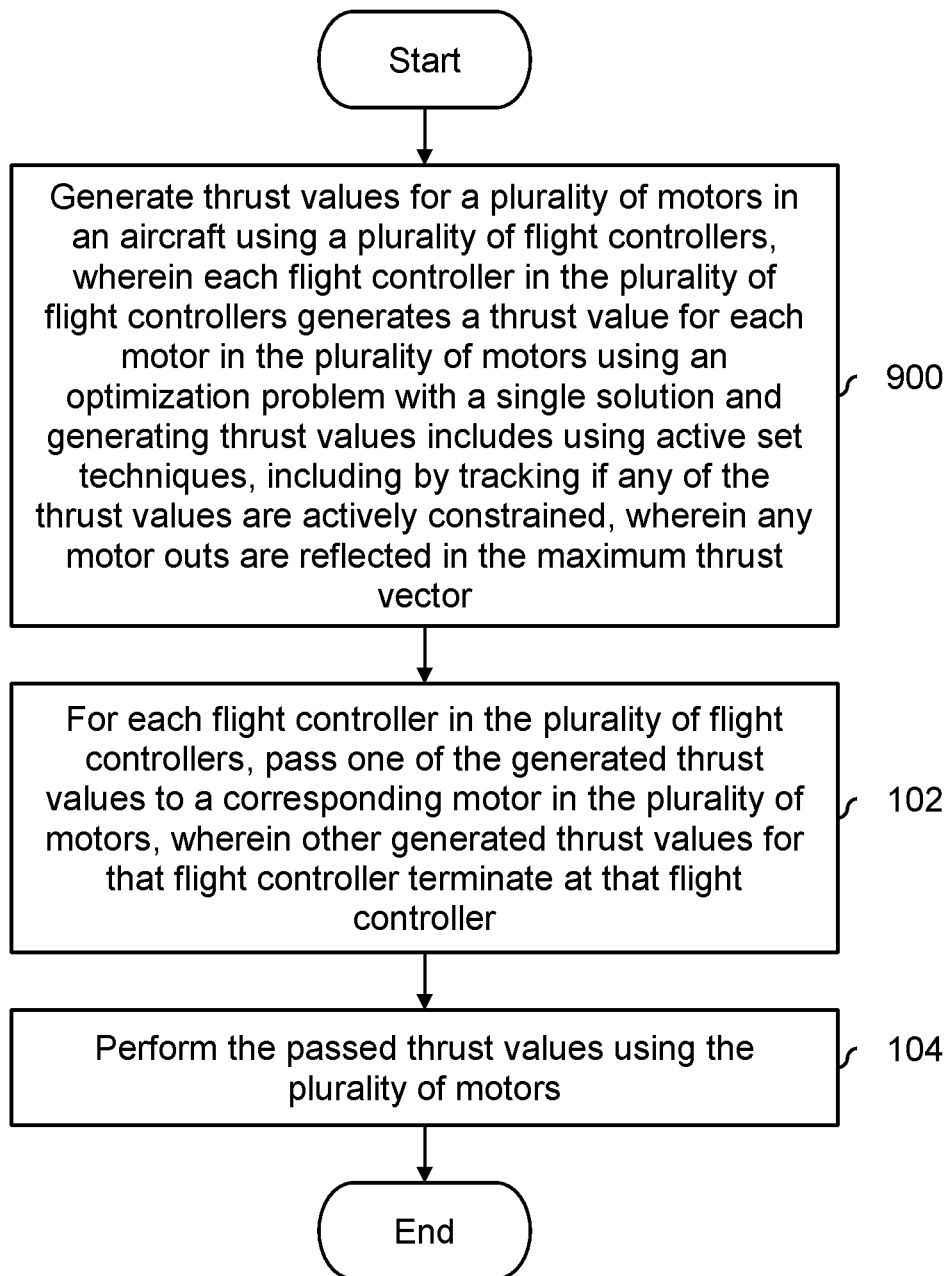
FIG. 9 is a flowchart illustrating an embodiment of a process to generate thrust values, including by tracking if any of the thrust values are actively constrained.

FIG. 9 is a flowchart illustrating an embodiment of a process to generate thrust values, including by tracking if any of the thrust values are actively constrained. FIG. 9 is related to FIG. 1 and for convenience the same or similar reference numbers are used to show the same or related steps.

At 900, thrust values are generated for a plurality of motors in an aircraft using a plurality of flight controllers, wherein each flight controller in the plurality of flight controllers generates a thrust value for each motor in the plurality of motors using an optimization problem with a single solution and generating thrust values includes using active set techniques, including by tracking if any of the thrust values are actively constrained, wherein any motor outs are reflected in the maximum thrust vector.

As described above, this simplifies the thrust allocation process since the actively constrained thrust values (e.g., at their respective maximum element within $T_{max}$ or at zero) are first assumed to be actively constrained in the next iteration and so the thrust value will (again) be the maximum value, simplifying the processing.

In some embodiments, warm starting is used in combination with active set techniques (not shown in FIG. 9). For example, suppose a first set of thrust values is generated or otherwise passed to the motors for an $i^{th}$ set of desired forces and moments at a first point in time t (alternatively, an index i in discrete-time applications). With warm starting, the first set of desired forces and moments is used as the initial and viable set of thrust values with which the active set process begins when generating a second set of thrust values for a second set of desired forces and moments associated with a second (next) point in time or index. This may help the active set processing to more quickly find a set of thrust values to output, reducing processing time.

As described above, in some embodiments, step 900 further includes (not shown in FIG. 9) the limitation that a first set of thrust values generated for a first set of desired forces and moments is used as an initial set of thrust values when generating thrust values for a second, subsequent set of desired forces and moments.

At 102, for each flight controller in the plurality of flight controllers, one of the generated thrust values is passed to a corresponding motor in the plurality of motors, wherein other generated thrust values for that flight controller terminate at that flight controller.

At 104, the passed thrust values are performed using a plurality of motors.

Returning briefly to Equation 2, a drawback with Equation 2 is that control along various axes cannot be prioritized and/or weighted. For example, with the open cockpit of the eVTOL multicopter shown in FIG. 2, it is very important that the vehicle not flip upside down because any occupants could be severely hurt or killed. As such, roll control (e.g., associated with desired roll moment, $M_{xdes}$) and pitch control (e.g., associated with desired pitch moment, $M_{ydes}$) may be more important that yaw control (e.g., associated with yaw moment $M_{zdes}$) and altitude control (e.g., associated with vertical force, $F_{zdes}$). To put it another way, it may be more important to not flip over, even at the expense of the vehicle descending (e.g., slowly) and rotating like a spinning pancake to prevent the vehicle from flipping over. Equation 2 does not permit this or have this capability. The following example equation introduces such weighting and/or prioritization into the optimization function of Equation 2.

Equation 3

An example least-squares optimization problem with weighting.

$$\underset{T}{\text{minimize}} \quad \left\| \sqrt{W}(AT - F_{des}) \right\|_2$$
$$\text{subject to} \quad 0 \le T \le T_{max}$$

In Equation 3, W is a diagonal weighting matrix (more generally referred to as a axes weighting parameter). With such an axes weighting parameter, control about one or more axes that are more important (e.g., roll and pitch in the above example) can be prioritized over one or more less important axes (e.g., yaw). As described above, control about the roll and pitch axes is important to prevent the exemplary open-cockpit eVTOL multicopter from flipping over, even at the expense of some yaw control. To put it another way, it may be acceptable for the vehicle to (e.g., slowly) rotate about the yaw (vertical) axis while performing an emergency landing if it prevents the eVTOL multicopter from flipping over. Furthermore, the axes weighting parameter (e.g., W) is parameterizable (e.g., W is adjustable as opposed to a strict binary on/off) and continuous (e.g., which is beneficial because there is no risk of a discontinuity in W causing the system to not find a solution for the thrust values and/or delaying the search for a solution due to the discontinuity). In one example $$W = \begin{bmatrix} 100 & & & \\ & 1000 & & \\ & & 1000 & \\ & & & 10 \end{bmatrix}$$

which most heavily weights or prioritizes satisfying the desired roll and pitch moments (e.g., the two values of 1000), then the desired vertical force (e.g., the value of 100 in the upper left corner), and finally the lowest priority is the desired yaw moment (e.g., the value of 10 in the lower right corner). In various embodiments, the weighting is chosen or otherwise selected to be more or less aggressive, tailored to a particular application (e.g., more conservative for manned flight versus unmanned/autonomous flight), and/or changed dynamically (e.g., during flight).

The following figure describes this example more formally.

Figure 10:
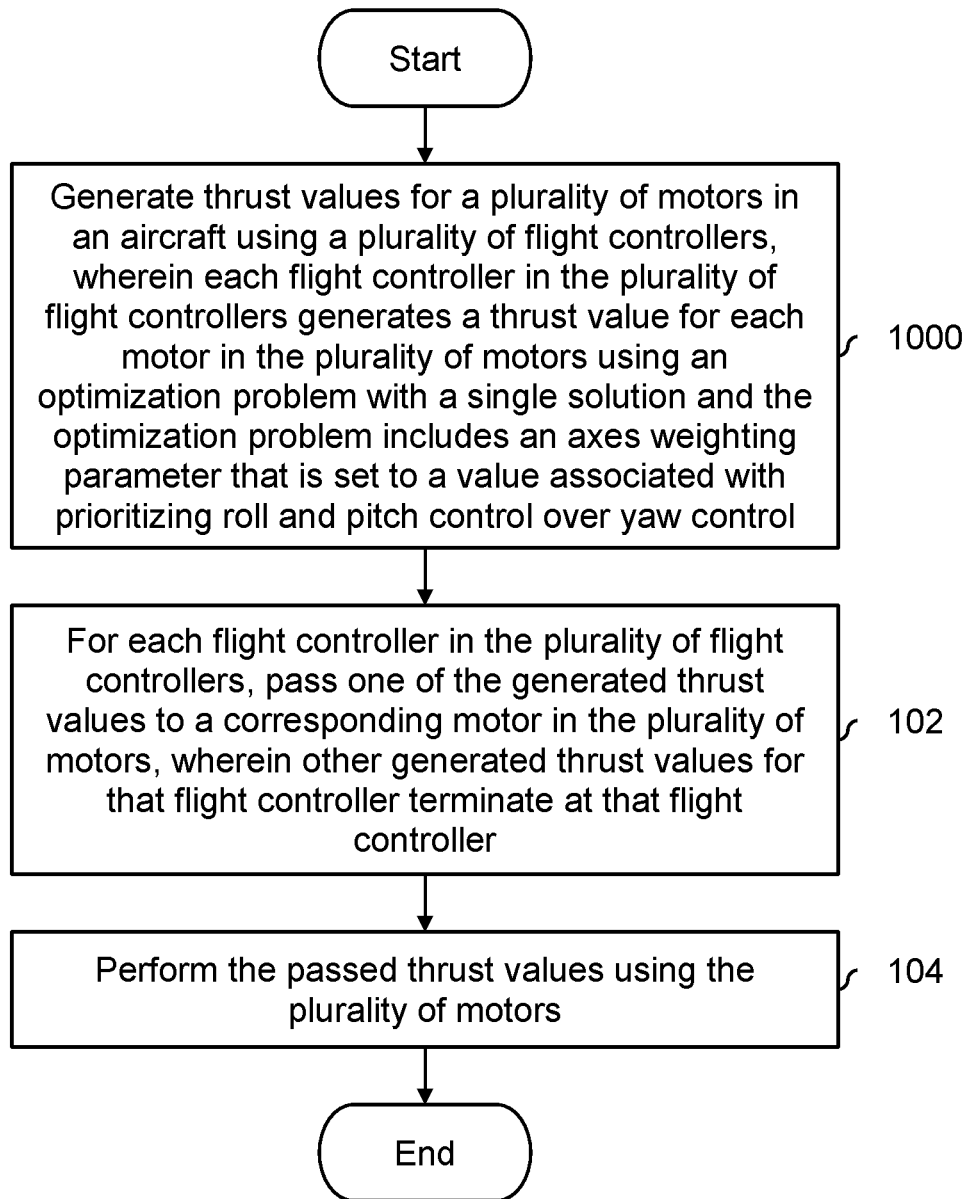
FIG. 10 is a flowchart illustrating an embodiment of a process to generate thrust values, including by using an axes weighting parameter.

FIG. 10 is a flowchart illustrating an embodiment of a process to generate thrust values, including by using an axes weighting parameter. FIG. 10 is related to FIG. 1 and for convenience the same or similar reference numbers are used to show the same or related steps.

At 1000, thrust values are generated for a plurality of motors in an aircraft using a plurality of flight controllers, wherein each flight controller in the plurality of flight controllers generates a thrust value for each motor in the plurality of motors using an optimization problem with a single solution and the optimization problem includes an axes weighting parameter that is set to a value associated with prioritizing roll and pitch control over yaw (and in some embodiments altitude as well) control.

At 102, for each flight controller in the plurality of flight controllers, one of the generated thrust values is passed to a corresponding motor in the plurality of motors, wherein other generated thrust values for that flight controller terminate at that flight controller.

At 104, the passed thrust values are performed using a plurality of motors.

Returning briefly to Equation 3, Equation 3 leaves open the possibility that there are multiple solutions. This is undesirable with the distributed control system described herein because it requires that all of the flight controllers (see, e.g., FIG. 5) generate the same set of thrust values for the motors. The following equation shows an example of an optimization function with a regularization term to ensure there is only one solution (or, to put it another way, that the function is strictly convex).

Equation 4

An example least-squares optimization problem with weighting and a regularization term.

$$\underset{T}{\text{minimize}} \quad \left\| \sqrt{W} (AT - F_{des}) \right\|_2 + \epsilon \|T\|_2$$

$$\text{subject to} \quad 0 \le T \le T_{max}$$

The second term (i.e., $\epsilon \|T\|_2$) ensures there is only a single solution and the value of $\epsilon$ keeps the importance of satisfying the second term (e.g., to ensure a single solution) relatively small compared to the more important objective of satisfying the desired forces and moments (i.e., the first term). Unfortunately, the newly added second term (i.e., $\epsilon \|T\|_2$) does not have the same objectives as the first term, and therefore the function is trading off between two different objectives.

Returning briefly to Equation 1, the second term there (i.e., $\epsilon \|V_n^T T\|_2$) still enforces the single-solution constraint but also removes that term from affecting the minimization and/or optimization operation (e.g., because in the term $\epsilon \|V_n^T\|_2$, the thrust vector T is projected onto the null space of the forces and moments so that that term does not affect what thrust value T produces the minimum (or, more generally, optimum) value). It is noted that $\epsilon$ is not absolutely necessary in Equation 1 but it may be desirable to keep $\epsilon$ in Equation 1 (e.g., so that the contribution from the second term is more clearly kept small in order to better convey the concept to readers or people implementing the feature, for inspection, and/or on principle). This is in contrast with Equation 4, where the practical importance of using $\epsilon$ to keep the weight of the second term relatively small is much more important.

The following figure describes this example more formally.

Figure 11:
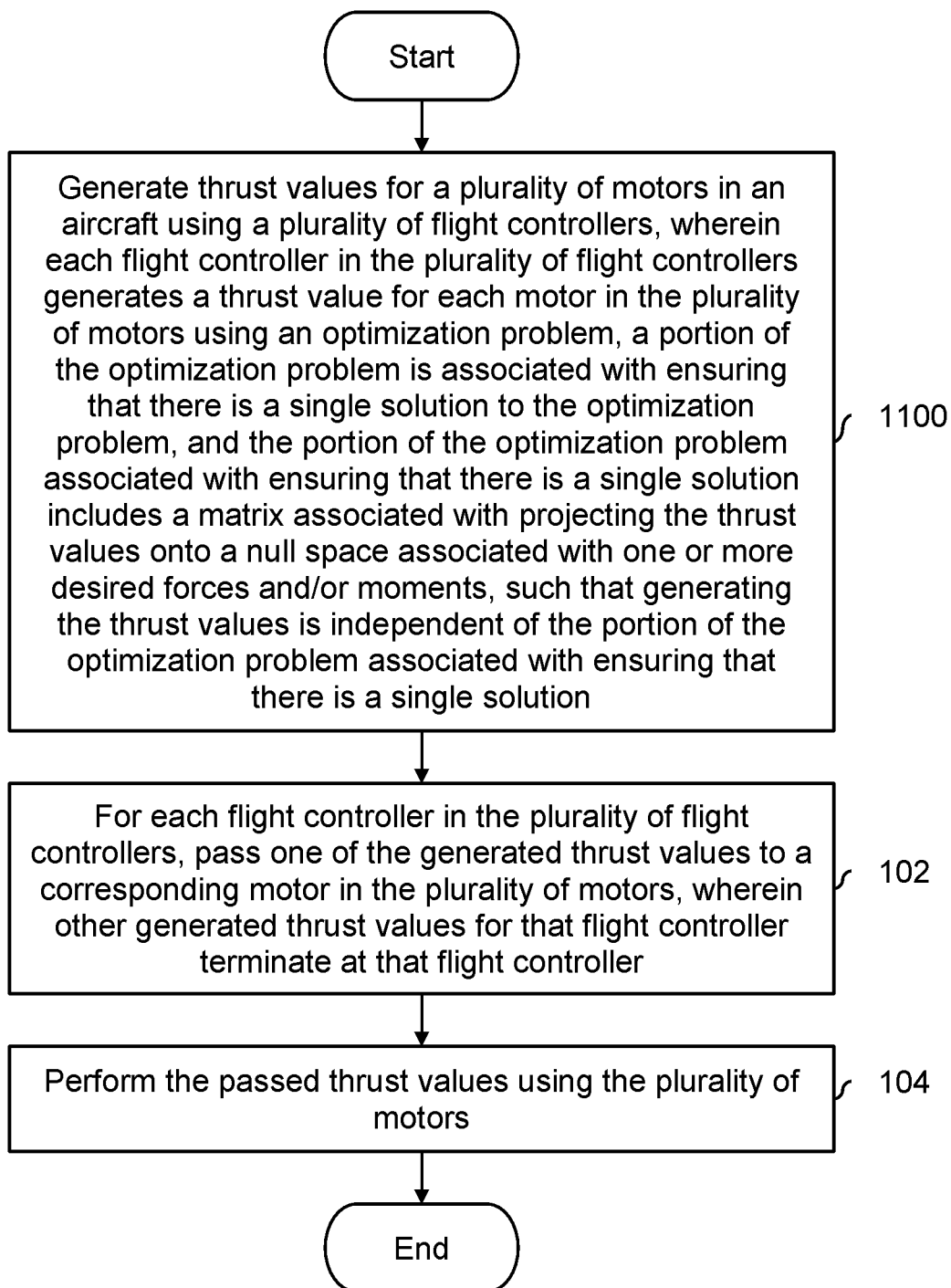
FIG. 11 is a flowchart illustrating an embodiment of a process to generate thrust values, where the optimization problem has multiple portions or terms associated with different objectives.

FIG. 11 is a flowchart illustrating an embodiment of a process to generate thrust values, where the optimization problem has multiple portions or terms associated with different objectives. FIG. 11 is related to FIG. 1 and for convenience the same or similar reference numbers are used to show the same or related steps.

At 1100, thrust values are generated for a plurality of motors in an aircraft using a plurality of flight controllers, wherein each flight controller in the plurality of flight controllers generates a thrust value for each motor in the plurality of motors using an optimization problem with a single solution, a portion of the optimization problem is associated with ensuring that there is a single solution to the optimization problem, and the portion of the convex optimization problem associated with ensuring that there is a single solution includes a matrix associated with projecting the thrust values onto a null space associated with one or more desired forces and/or moments, such that generating the thrust values is independent of the portion of the convex optimization problem associated with ensuring that there is a single solution. See, for example, the second term in Equation 1.

For example, in Equation 1, $\epsilon \|V_n^T\|_2$ is an example of a portion of an optimization problem associated with ensuring that the optimization problem has a single solution. As described above, $V_n^T$ projects the thrust values (T) onto a null space such that the term or portion $\epsilon \|V_n^T\|_2$ is constant over T and the optimization problem is independent of that term or portion of the problem.

At 102, for each flight controller in the plurality of flight controllers, one of the generated thrust values is passed to a corresponding motor in the plurality of motors, wherein other generated thrust values for that flight controller terminate at that flight controller.

At 104, the passed thrust values are performed using a plurality of motors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
a plurality of flight controllers configured to:
generate thrust values for a plurality of motors in the aircraft, wherein each flight controller in the plurality of flight controllers is configured to generate a complete set of thrust values that includes a thrust value for each motor in the plurality of motors using an optimization problem with a single solution, wherein the optimization problem includes an axes weighting parameter that is set to a value associated with prioritizing roll and pitch control over yaw control, wherein the plurality of flight controllers include a first flight controller and a second flight controller, wherein the plurality of motors includes a first motor and a second motor, and wherein the complete set of thrust values includes a first thrust value, a second thrust value, a third thrust value, and a fourth thrust value; and
from each flight controller in the plurality of flight controllers, pass only one of the generated thrust values in that flight controller's complete set of thrust values to a corresponding motor in the plurality of motors, wherein the first flight controller passes the first thrust value and the second thrust value to a decision block, wherein the second flight controller passes the third thrust value and the fourth thrust value to decision block, wherein the decision block determines a first consensus thrust value based on a combination of the first thrust value, the second thrust value, the third thrust value, the fourth thrust value, passes the first consensus thrust value to the first motor, and does not pass a second consensus thrust value to the first motor, and wherein the decision block determines the second consensus thrust value based on the combination, passes the second consensus thrust value to the second motor, and does not pass the first consensus thrust value to the second motor; and
the plurality of motors is configured to perform the passed thrust values.

2. The aircraft of claim 1, wherein the optimization problem is a strictly convex optimization function.

3. The aircraft of claim 1, wherein using the optimization problem includes finding a minimum of a strictly convex optimization function.

4. The aircraft of claim 1, wherein a same desired forces and moments are inputted to each of the plurality of flight controllers to generate the thrust values for the plurality of motors in the aircraft.

5. The aircraft of claim 1, wherein the generated thrust values are within a threshold tolerance of each other.

6. A method, comprising:
  generating thrust values for a plurality of motors in an aircraft, wherein each flight controller in the plurality of flight controllers is configured to generate a complete set of thrust values that includes a thrust value for each motor in the plurality of motors using an optimization problem with a single solution, wherein the optimization problem includes an axes weighting parameter that is set to a value associated with prioritizing roll and pitch control over yaw control, wherein the plurality of flight controllers include a first flight controller and a second flight controller, wherein the plurality of motors includes a first motor and a second motor, and wherein the complete set of thrust values includes a first thrust value, a second thrust value, a third thrust value, and a fourth thrust value;
  from each flight controller in the plurality of flight controllers, passing only one of the generated thrust values in that flight controller's complete set of thrust values to a corresponding motor in the plurality of motors, wherein the first flight controller passes the first thrust value and the second thrust value to a decision block, wherein the second flight controller passes the third thrust value and the fourth thrust value to decision block, wherein the decision block determines a first consensus thrust value based on a combination of the first thrust value, the second thrust value, the third thrust value, the fourth thrust value, passes the first consensus thrust value to the first motor, and does not pass a second consensus thrust value to the first motor, and wherein the decision block determines the second consensus thrust value based on the combination, passes the second consensus thrust value to the second motor, and does not pass the first consensus thrust value to the second motor; and
  performing the passed thrust values using the plurality of motors.

7. The method of claim 6, wherein the optimization problem is a strictly convex optimization function.

8. The method of claim 6, wherein using the optimization problem includes finding a minimum of a strictly convex optimization function.

9. The method of claim 6, wherein a same desired forces and moments are inputted to each of the plurality of flight controllers to generate the thrust values for the plurality of motors in the aircraft.

10. The method of claim 6, wherein the generated thrust values are within a threshold tolerance of each other.

11. A computer program product being embodied in a non-transitory computer readable storage medium and comprising computer instructions for:
  generating thrust values for a plurality of motors in the aircraft, wherein each flight controller in the plurality of flight controllers is configured to generate a complete set of thrust values that includes a thrust value for each motor in the plurality of motors using an optimization problem with a single solution, wherein the optimization problem includes an axes weighting parameter that is set to a value associated with prioritizing roll and pitch control over yaw control, wherein the plurality of flight controllers include a first flight controller and a second flight controller, wherein the plurality of motors includes a first motor and a second motor, and wherein the complete set of thrust values includes a first thrust value, a second thrust value, a third thrust value, and a fourth thrust value;
  from each flight controller in the plurality of flight controllers, passing only one of the generated thrust values in that flight controller's complete set of thrust values to a corresponding motor in the plurality of motors, wherein the first flight controller passes the first thrust value and the second thrust value to a decision block, wherein the second flight controller passes the third thrust value and the fourth thrust value to decision block, wherein the decision block determines a first consensus thrust value based on a combination of the first thrust value, the second thrust value, the third thrust value, the fourth thrust value, passes the first consensus thrust value to the first motor, and does not pass a second consensus thrust value to the first motor, and wherein the decision block determines the second consensus thrust value based on the combination, passes the second consensus thrust value to the second motor, and does not pass the first consensus thrust value to the second motor; and
  performing the passed thrust values using the plurality of motors.

12. The computer program product of claim 11, wherein the optimization problem is a strictly convex optimization function.

13. The computer program product of claim 11, wherein a same desired forces and moments are inputted to each of the plurality of flight controllers to generate the thrust values for the plurality of motors in the aircraft.

14. The computer program product of claim 11, wherein the generated thrust values are within a threshold tolerance of each other.

* * * * *